US007937271B2

(12) United States Patent
You

(10) Patent No.: US 7,937,271 B2
(45) Date of Patent: *May 3, 2011

(54) AUDIO DECODING USING VARIABLE-LENGTH CODEBOOK APPLICATION RANGES

(75) Inventor: Yuli You, Thousand Oaks, CA (US)

(73) Assignee: Digital Rise Technology Co., Ltd., Guangzhou, Guangdong (CN)

( * ) Notice: Subject to any disclaimer, the term of this patent is extended or adjusted under 35 U.S.C. 154(b) by 1033 days.

This patent is subject to a terminal disclaimer.

(21) Appl. No.: 11/689,371

(22) Filed: Mar. 21, 2007

(65) Prior Publication Data

US 2007/0174053 A1 Jul. 26, 2007

Related U.S. Application Data

(63) Continuation-in-part of application No. 11/669,346, filed on Jan. 31, 2007, now Pat. No. 7,895,034, and a continuation-in-part of application No. 11/558,917, filed on Nov. 12, 2006, and a continuation-in-part of application No. 11/029,722, filed on Jan. 4, 2005, now Pat. No. 7,630,902.

(60) Provisional application No. 60/610,674, filed on Sep. 17, 2004, provisional application No. 60/822,760, filed on Aug. 18, 2006.

(51) Int. Cl.

| | |
|---|---|
| ***G06F 15/00*** | (2006.01) |
| ***G10L 19/00*** | (2006.01) |
| ***G10L 19/14*** | (2006.01) |
| ***G10L 19/12*** | (2006.01) |
| ***G10L 19/02*** | (2006.01) |
| ***G10L 21/04*** | (2006.01) |
| ***H04B 1/66*** | (2006.01) |
| ***H04N 11/02*** | (2006.01) |

(52) U.S. Cl. ........ 704/500; 704/200; 704/201; 704/211; 704/212; 704/222; 704/229; 704/230; 704/503; 375/240; 375/240.22; 375/240.25

(58) Field of Classification Search .................. 704/200, 704/201, 211, 212, 222, 229, 230, 500, 503; 375/240.22, 240, 240.25

See application file for complete search history.

(56) References Cited

U.S. PATENT DOCUMENTS 5,214,742 A 5/1993 Edler (Continued)

FOREIGN PATENT DOCUMENTS

WO WO 9215153 A2 9/1992

(Continued)

OTHER PUBLICATIONS

Office Action dated Nov. 26, 2008, in U.S. Appl. No. 11/029,722, which is one of the parents of the present application, in which the Examiner issued (among other things) a provisional nonstatutory double-patenting rejection over the present application.

(Continued)

*Primary Examiner* — James S Wozniak
*Assistant Examiner* — Paras Shah
(74) *Attorney, Agent, or Firm* — Joseph G. Swan, P.C.

(57) ABSTRACT

Provided are, among other things, systems, methods and techniques for decoding an audio signal from a frame-based bit stream. Each frame includes processing information pertaining to the frame and entropy-encoded quantization indexes representing audio data within the frame. The processing information includes: (i) code book indexes, (ii) code book application information specifying ranges of entropy-encoded quantization indexes to which the code books are to be applied, and (iii) window information. The entropy-encoded quantization indexes are decoded by applying the identified code books to the corresponding ranges of entropy-encoded quantization indexes. Subband samples are then generated by dequantizing the decoded quantization indexes, and a sequence of different window functions that were applied within a single frame of the audio data is identified based on the window information. Time-domain audio data are obtained by inverse-transforming the subband samples and using the plural different window functions indicated by the window information.

20 Claims, 3 Drawing Sheets

U.S. PATENT DOCUMENTS

| | | | | |
|---|---|---|---|---|
| 5,285,498 | A * | 2/1994 | Johnston | 381/2 |
| 5,321,729 | A | 6/1994 | Schroder et al. | |
| 5,394,473 | A * | 2/1995 | Davidson | 704/200.1 |
| 5,848,391 | A * | 12/1998 | Bosi et al. | 704/200.1 |
| 6,226,608 | B1 * | 5/2001 | Fielder et al. | 704/229 |
| 6,266,644 | B1 * | 7/2001 | Levine | 704/503 |
| 6,487,535 | B1 * | 11/2002 | Smyth et al. | 704/500 |
| 7,199,735 | B1 * | 4/2007 | Wen et al. | 341/107 |
| 7,299,190 | B2 * | 11/2007 | Thumpudi et al. | 704/500 |
| 7,328,150 | B2 * | 2/2008 | Chen et al. | 704/219 |
| 7,460,993 | B2 * | 12/2008 | Chen et al. | 704/230 |
| 2003/0112869 | A1 * | 6/2003 | Chen et al. | 375/240.12 |
| 2004/0181403 | A1 * | 9/2004 | Hsu | 704/230 |
| 2005/0144017 | A1 * | 6/2005 | Kabi et al. | 704/500 |
| 2005/0192765 | A1 | 9/2005 | Slothers et al. | |

FOREIGN PATENT DOCUMENTS

| | | |
|---|---|---|
| WO | WO/9245153 | 9/1992 |

OTHER PUBLICATIONS

"0.8.1.2Vorbis I specification", downloaded from http://xiph.org/vorbis/doc/Vorbis_I_spec.pdf. 2004.

Ted Painter and Andreas Spanias, "Perceptual Coding of Digital Audio", Proceedings of the IEEE, vol. 88, No. 4, Apr. 2000, pp. 451-513.

* cited by examiner

AUDIO DECODING USING VARIABLE-LENGTH CODEBOOK APPLICATION RANGES

This application is a continuation-in-part of U.S. patent application Ser. No. 11/669,346, filed Jan. 31, 2007, now U.S. Pat. No. 7,895,034, and titled “Audio Encoding System” (the ’346 Application); is a continuation-in-part of U.S. patent application Ser. No. 11/558,917, filed Nov. 12, 2006, and titled “Variable-Resolution Processing of Frame-Based Data” (the ’917 Application); is a continuation-in-part of U.S. patent application Ser. No. 11/029,722 (now U.S. Pat. No. 7,630,902), filed Jan. 4, 2005, and titled “Apparatus and Methods for Multichannel Digital Audio Coding” (the ’722 Application), which in turn claims the benefit of U.S. Provisional Patent Application Ser. No. 60/610,674, filed on Sep. 17, 2004, and also titled “Apparatus and Methods for Multichannel Digital Audio Coding”; and claims the benefit of U.S. Provisional Patent Application Ser. No. 60/822,760, filed on Aug. 18, 2006, and titled “Variable-Resolution Filtering” (the ’760 Application). Each of the foregoing applications is incorporated by reference herein as though set forth herein in full.

FIELD OF THE INVENTION

The present invention pertains to systems, methods and techniques for decoding of audio signals, such as digital audio signals received across a communication channel or read from a storage device.

BACKGROUND

A variety of different techniques for encoding and then decoding audio signals exist. However, improvements in performance, quality and efficiency are always needed.

SUMMARY OF THE INVENTION

The present invention addresses this need by providing, among other things, decoding systems, methods and techniques in which audio data are retrieved from a bit stream by applying code books to specified ranges of quantization indexes (in some cases even crossing boundaries of quantization units) and by identifying a sequence of different windows to be applied within a single frame of the audio data based on window information within the bit stream.

Thus, in one representative embodiment, the invention is directed to systems, methods and techniques for decoding an audio signal from a frame-based bit stream. Each frame includes processing information pertaining to the frame and entropy-encoded quantization indexes representing audio data within the frame. The processing information includes: (i) entropy code book indexes, (ii) code book application information specifying ranges of entropy-encoded quantization indexes to which the code books are to be applied, and (iii) window information. The entropy-encoded quantization indexes are decoded by applying the identified code books to the corresponding ranges of entropy-encoded quantization indexes. Subband samples are then generated by dequantizing the decoded quantization indexes, and a sequence of different window functions that were applied within a single frame of the audio data is identified based on the window information. Time-domain audio data are obtained by inverse-transforming the subband samples and using the plural different window functions indicated by the window information.

By virtue of the foregoing arrangement, it often is possible to achieve greater efficiency and simultaneously provide more acceptable reproduction of the original audio signal.

The foregoing summary is intended merely to provide a brief description of certain aspects of the invention. A more complete understanding of the invention can be obtained by referring to the claims and the following detailed description of the preferred embodiments in connection with the accompanying figures.

DESCRIPTION OF THE PREFERRED EMBODIMENT(S)

The present invention pertains to systems, methods and techniques for decoding audio signals, e.g., after retrieval from a storage device or reception across a communication channel. Applications in which the present invention may be used include, but are not limited to: digital audio broadcasting, digital television (satellite, terrestrial and/or cable broadcasting), home theater, digital theater, laser video disc players, content streaming on the Internet and personal audio players. The audio decoding systems, methods and techniques of the present invention can be used, e.g., in conjunction with the audio encoding systems, methods and techniques of the ’346 Application.

Figure 1:
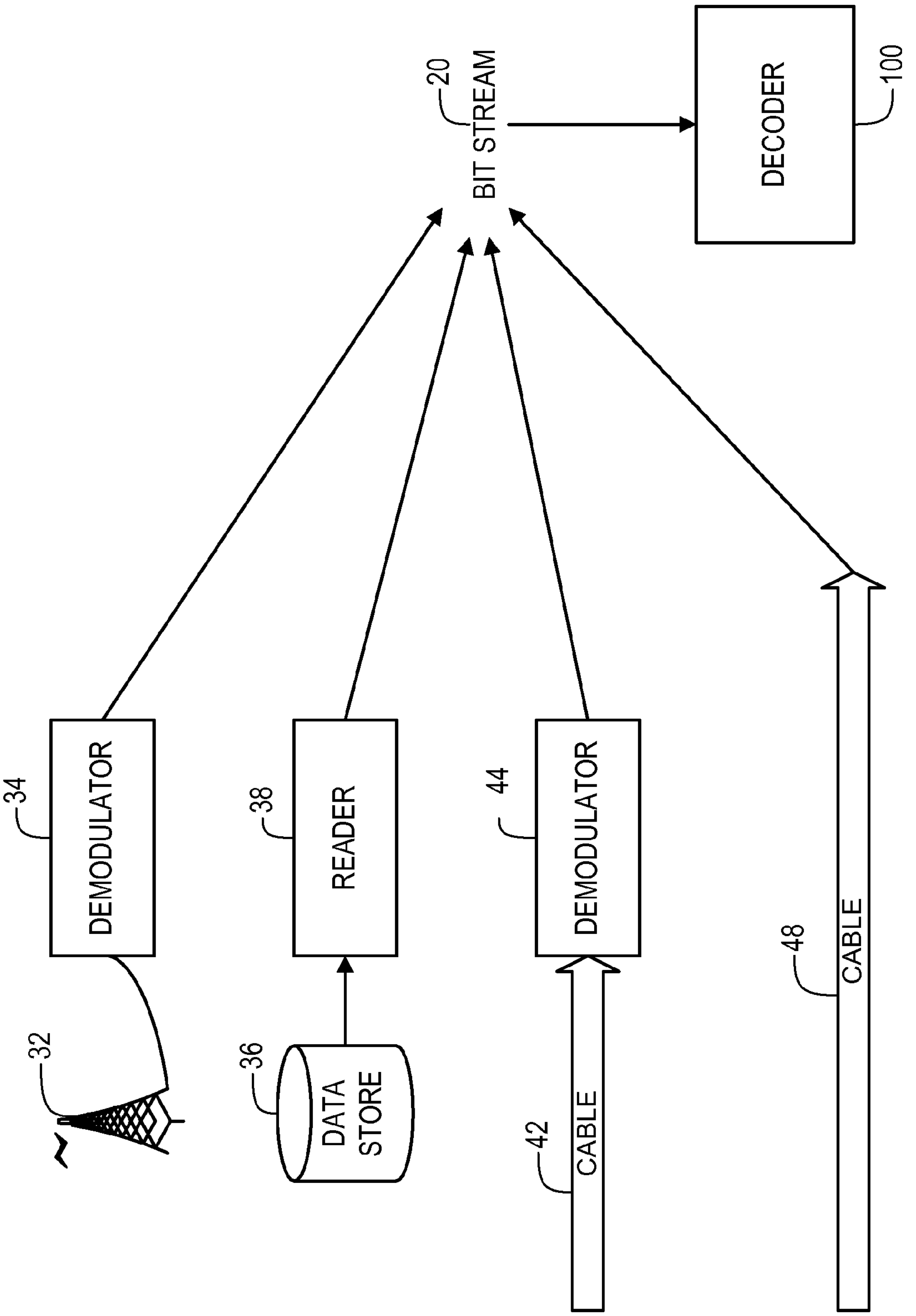
FIG. 1 is a block diagram illustrating various illustrative environments in which a decoder may be used, according to representative embodiments of the present invention.

Certain illustrative generic environments in which a decoder 100 according to the present invention may be used are illustrated in FIG. 1. Generally speaking, a decoder 100 according to the present invention receives as its input a frame-based bit stream 20 and that includes, for each frame, the actual audio data within that frame (typically, entropy-encoded quantization indexes) and various kinds of processing information (e.g., including control, formatting and/or auxiliary information). The bit stream 20 ordinarily will be input into decoder 100 via a hard-wired connection or via a detachable connector.

As indicated above, bit stream 20 could have originated from any of a variety of different sources. The sources include, e.g., a digital radio-frequency (or other electromagnetic) transmission which is received by an antenna 32 and converted into bit stream 20 in demodulator 34, a storage device 36 (e.g., semiconductor, magnetic or optical) from which the bit stream 20 is obtained by an appropriate reader 38, a cable connection 42 from which bit stream 20 is derived in demodulator 44, or a cable connection 48 which directly provides bit stream 20. Bit stream 20 might have been generated, e.g., using any of the techniques described in the ’346 Application. As indicated, in certain embodiments of the invention, bit stream 20 itself will have been derived from another signal, e.g., a multiplexed bit stream, such as those multiplexed according to MPEG 2 system protocol, where the audio bit stream is multiplexed with video bit streams of various formats, audio bit stream of other formats, and metadata; or a received radio-frequency signal that was modulated (using any of the known techniques) with redundancy-encoded, interleaved and/or punctured symbols representing bits of audio data.

As discussed in more detail in the '346 Application, in the preferred embodiments of the invention the audio data within bit stream 20 have been transformed into subband samples (preferably using a unitary sinusoidal-based transform technique), quantized, and then entropy-encoded. In the preferred embodiments, the audio data have been transformed using the modified discrete cosine transform (MDCT), quantized and then entropy-encoded using appropriate Huffman encoding. However, in alternate embodiments other transform and/or entropy-encoding techniques instead may be used, and references in the following discussion to MDCT or Huffman should be understood as exemplary only. The audio data are variously referred to herein as pulse-coded modulation (PCM) samples or audio samples; because the transform preferably is unitary, the number of samples is the same in the time domain and in the transform domain.

Also, although the audio data and much of the control, formatting and auxiliary information are described herein as having been Huffman encoded, it should be understood that such encoding generally is optional and is used in the preferred embodiments solely for the purpose of reducing data size. Where used, the decoder 10 preferably stores the same code books as are used by the encoder. The preferred Huffman code books are set forth in the '760 Application, where the "Code" is the Huffman code in decimal format, the "Bit Increment" is the number of additional bits (in decimal format) required for the current code as compared to the code on the previous line and the "Index" is the unencoded value in decimal format.

In the preferred embodiments, the input audio data are frame-based, with each frame defining a particular time interval and including samples for each of multiple audio channels during that time interval. Preferably, each such frame has a fixed number of samples, selected from a relatively small set of frame sizes, with the selected frame size for any particular time interval depending, e.g., upon the sampling rate and the amount of delay that can be tolerated between frames. More preferably, each frame includes 128, 256, 512 or 1,024 samples, with longer frames being preferred except in situations where reduction of delay is important. In most of the examples discussed below, it is assumed that each frame consists of 1,024 samples. However, such examples should not be taken as limiting.

Figure 2A:
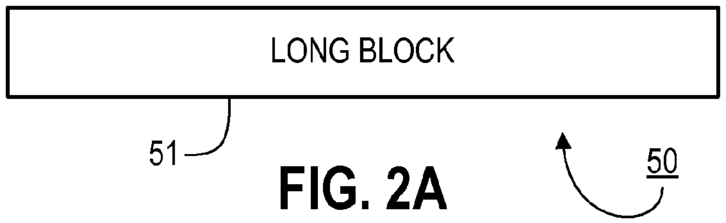
FIGS. 2A-B illustrate the use of a single long block to cover a frame and the use of multiple short blocks to cover a frame, respectively, according to a representative embodiment of the present invention.
Figure 2B:
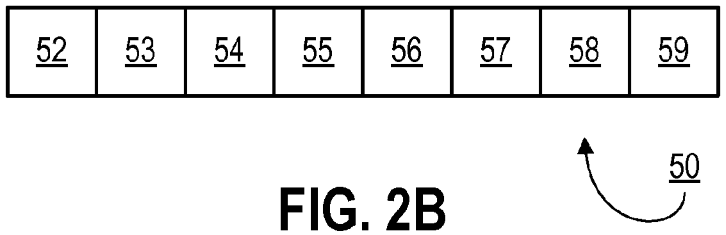

For processing purposes (primarily for MDCT or other transform processing), the frames are divided into a number of smaller preferably equal-sized blocks (sometimes referred to herein as "primary blocks" to distinguish them from MDCT or other transform blocks which typically are longer). This division is illustrated in FIGS. 2A&B. In FIG. 2A, the entire frame 50 is covered by a single primary block 51 (e.g., including 1,024 audio data samples). In FIG. 2B, the frame 50 is covered by eight contiguous primary blocks 52-59 (e.g., each including 128 audio data samples).

Each frame of samples can be classified as a transient frame (i.e., one that includes a signal transient) or a quasistationary frame (i.e., one that does not include a transient). In this regard, a signal transient preferably is defined as a sudden and quick rise (attack) or fall of signal energy. Transient signals occur only sparsely and, for purposes of the present invention, it is assumed that no more than two transient signals will occur in each frame.

The term "transient segment", as used herein, refers to an entire frame or a segment of a frame in which the signal that has the same or similar statistical properties. Thus, a quasistationary frame generally consists of a single transient segment, while a transient frame ordinarily will consist of two or three transient segments. For example, if only an attack or fall of a transient occurs in a frame, then the transient frame generally will have two transient segments: one covering the portion of the frame before the attack or fall and another covering the portion of the frame after the attack or fall. If both an attack and fall occur in a transient frame, then three transient segments generally will exist, each one covering the portion of the frame as segmented by the attack and fall, respectively.

Figure 3A:
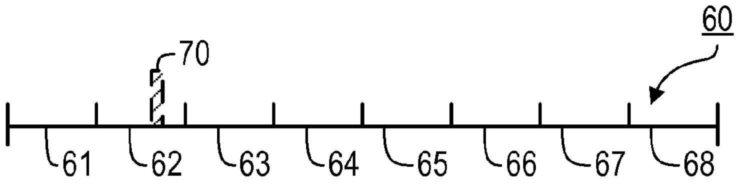
FIGS. 3A-C illustrate different examples of a transient frame according to a representative embodiment of the present invention.
Figure 3B:
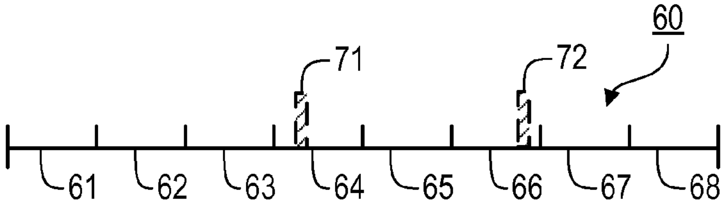
Figure 3C:
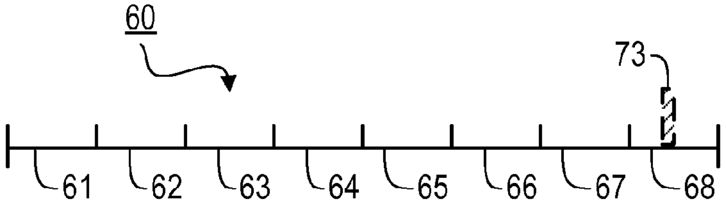

These possibilities are illustrated in FIGS. 3A-C, each of which illustrating a single frame 60 of samples that has been divided into eight equal-sized primary blocks 61-68. In FIG. 3A, a transient signal 70 occurs in the second block 62, so there are two transient segments, one consisting of block 61 alone and the other consisting of blocks 62-68. In FIG. 3B, a transient signal 71 occurs in block 64 and another transient signal 72 occurs in block 66, so there are three transient segments, one consisting of blocks 61-63, one consisting of blocks 64-65 and the last consisting of blocks 66-68. In FIG. 3C, a transient signal 73 occurs in block 68, so there are two transient segments, one consisting of blocks 61-67 and the other consisting of block 68 alone.

Figure 4:
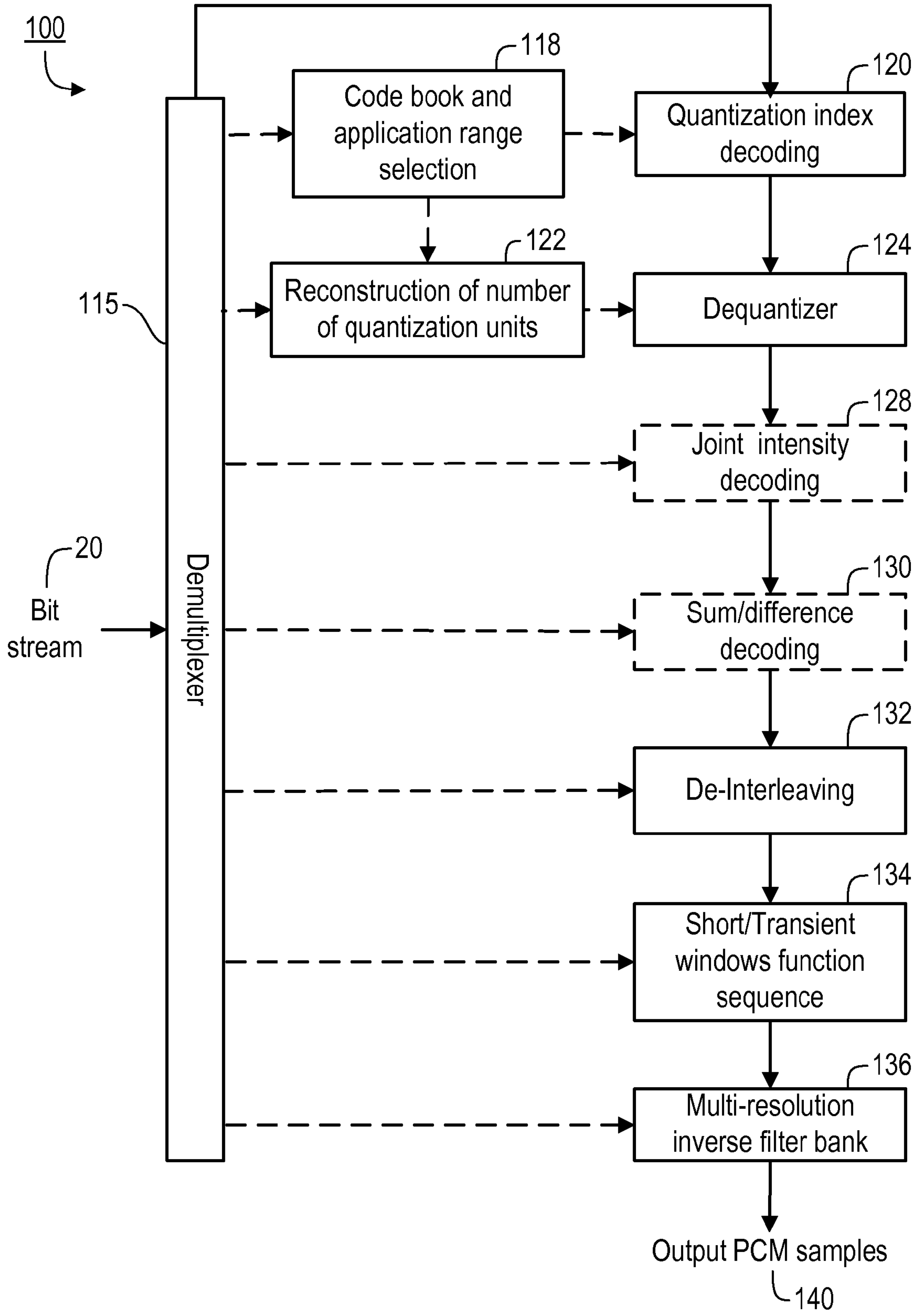
FIG. 4 is a block diagram of an audio signal decoding system 10 according to a representative embodiment of the present invention.

FIG. 4 is a block diagram of audio signal decoding system 100 according to a representative embodiment of the present invention, in which the solid arrows indicate the flow of audio data, the broken-line arrows indicate the flow of control, formatting and/or auxiliary information, and the broken-line boxes indicate components that in the present embodiment are instantiated only if indicated in the corresponding control data in bit stream 20, as described in more detail below. In a representative sub-embodiment, the individual sections, modules or components illustrated in FIG. 4 are implemented entirely in computer-executable code, as described below. However, in alternate embodiments any or all of such sections or components may be implemented in any of the other ways discussed herein.

The bit stream 20 initially is input into demultiplexer 115, which divides the bit stream 20 into frames of data and unpacks the data in each frame in order to separate out the processing information and the audio-signal information. As to the first task, the data in bit stream 20 preferably are interpreted as a sequence of frames, with each new frame beginning with the same "synchronization word" (preferably, 0x7FFF).

Computer program listings for performing these functions, according to a representative embodiment of the present invention, are set forth in the '760 Application (which is incorporated by reference herein) and include, e.g., the Bit_Stream ( ), Frame( ), FrameHeader( ) and UnpackWinSequence( ) modules described therein, as well as the other modules invoked by or referenced in such listed modules or the descriptions of them.

The structure for each data frame preferably is as follows:

| | |
|---|---|
| Frame Header | Synchronization word (preferably, 0x7FFF)<br>Description of the audio signal, such as sample rate, the number of normal channels, the number of low-frequency effect (LFE) channels and so on. |
| Normal Channels: 1 to 64 | Audio data for all normal channels (up to 64 such channels in the present embodiment) |

-continued

| | |
|---|---|
| LFE Channels: 0 to 3 | Audio data for all LFE channels (up to 3 such channels in the present embodiment) |
| Error Detection | Error-detection code for the current frame of audio data. When detected, the error-handling program is run. |
| Auxiliary Data | Time code and/or any other user-defined information |

Header Information.

Preferably included within the frame header is a single-bit field "nFrmHeaderType" which indicates one of two possible different types of frames, a General frame (e.g., indicated by nFrmHeaderType=0) or an Extension frame (e.g., indicated by nFrmHeaderType=1). The bits following this flag make up the rest of the header information. In the preferred embodiments, that information is summarized as follows, depending upon whether the frame has been designated as General or Extension:

| | Number of Bits | |
|---|---|---|
| Different Words | General Frame Header | Extension Frame Header |
| nNumWord | 10 | 13 |
| nNumBlocksPerFrm | 2 | 2 |
| nSampleRateIndex | 4 | 4 |
| nNumNormalCh | 3 | 6 |
| nNumLfeCh | 1 | 2 |
| bAuxChCfg | 1 | 1 |
| bUseSumDiff | 1 | 0 |
| bUseJIC | 1 | 0 |
| nJicCb | 5 | 0 |

Thus, for example, if nFrmHeaderType indicates a General frame header, then the first 10 bits following nFrmHeaderType are interpreted as nNumWord (defined below), the next 3 bits are interpreted as nNumNormalCh (defined below), and so on. However, if nFrmHeaderType indicates an Extension frame header, then the first 13 bits following nFrmHeaderType are interpreted as nNumWord, the next 6 bits are interpreted as nNumNormalCh, and so on. The following discussion explains the various header fields used in the present embodiment of the invention.

The field "nNum Word" indicates the length of the audio data in the current frame (in 32-bit words) from the beginning of the synchronization word (its first byte) to the end of the error-detection word for the current frame.

The field "nNumBlocksPerFrm" indicates the number of short-window Modified Discrete Cosine Transform (MDCT) blocks corresponding to the current frame of audio data. In the preferred embodiments of the invention, one short-window MDCT block contains 128 primary audio data samples (preferably entropy-encoded quantized subband samples), so the number of primary audio data samples corresponding to a frame of audio data is 128*nNumBlocksPerFrm.

It is noted that, in order to avoid boundary effects, the MDCT block preferably is larger than the primary block and, more preferably, twice the size of the primary block. According, if the short primary block size consists of 128 audio data sample, then the short MDCT block preferably consists of 256 samples, and if the long primary block consists of 1,024 audio data samples, then the long MDCT block consists of 2,048 samples. More preferably, each primary block consists of the new (next subsequent) audio data samples.

The field "nSampleRateIndex" indicates the index of the sampling frequency that was used for the audio signal. One example of a set of indexes and corresponding sample frequencies is shown in the following table:

| nSampleRateIndex | Sampling frequency (Hz) |
|---|---|
| 0 | 8000 |
| 1 | 11025 |
| 2 | 12000 |
| 3 | 16000 |
| 4 | 22050 |
| 5 | 24000 |
| 6 | 32000 |
| 7 | 44100 |
| 8 | 48000 |
| 9 | 88200 |
| 10 | 96000 |
| 11 | 174600 |
| 12 | 192000 |
| 13 | Reserved |
| 14 | Reserved |
| 15 | Reserved |

The field "nNumNormalCh" indicates the number of normal channels. The number of bits representing this field is determined by the frame header type. In the present embodiment, if nfrmHeader Type indicates a General frame header, then 3 bits are used and the number of normal channels can range from 1 to 8. On the other hand, if nFrmHeaderType indicates an Extension frame header, then 6 bits are used and the number of normal channels can range from 1 to 64.

The field "nNumLfe" indicates the number of LFE channels. In the present embodiment, if nFrMHeaderType indicates a General frame header, then 1 bit is used and the number of normal channels can range from 0 to 1. On the other hand, if nFrmHeaderType indicates an Extension frame header, then 2 bits are used and the number of normal channels can range from 0 to 3.

The field "bAuxChCfg" indicates whether there is any auxiliary data at the end of the current frame, e.g., containing additional channel configuration information. Preferably, bAuxChCfg=0 means no and bAuxChCfg=1 means yes.

The field "bUseSumDiff" indicates whether sum/difference encoding has been applied in the current frame. This field preferably is present only in the General frame header and does not appear in the Extension frame header. Preferably, bUseSumDiff=0 means no and bUseSumDiff=1 means yes.

The field "bUseJIC" indicates whether joint intensity encoding has been applied in the current frame. Again, this field preferably is present only in the General frame header and does not appear in the Extension frame header. Preferably, bUseJIC=0 means no and bUseJIC=1 means yes.

The field "njicCb" indicates the starting critical band of joint intensity encoding if joint intensity encoding has been applied in the current frame. Again, this field preferably is present only in the General frame header and does not appear in the Extension frame header.

As indicated above, all of the data in the header is processing information. As will become apparent below, some of the channel-specific data also is processing information, although the vast majority of such data are audio data samples.

Channel Data Structure.

In the preferred embodiments, the general data structure for each normal channel is as follows:

| | | |
|---|---|---|
| Window Sequence | Window function index | Indicates MDCT window function(s) |
| | The number of transient segments | Indicates the number of transient segments - only used for a transient frame. |
| | Transient segment length | Indicate the lengths of the transient segments - only used for a transient frame |
| Huffman Code Book Indexes and Application | The number of code books | The number of Huffman code books which each transient segment uses |
| | Application ranges | Application range of each Huffman code book |
| Ranges | Code book indexes | Code book index for each Huffman code book |
| Subband Sample Quantization Indexes | Quantization indexes of all subband samples | |
| Quantization Step Size Indexes | Quantization step size index of each quantization unit | |
| Sum/Difference encoding Decision | Indicates whether the decoder should perform sum/difference decoding on the samples of a quantization unit. | |
| Joint Intensity Coding Scale Factor Indexes | Indexes for the scale factors to be used to reconstruct subband samples of the joint quantization units from the source channel. | |

However, in certain embodiments not all of the normal channels contain the window sequence information. If the window sequence information is not provided for one or more of the channels, this group of data preferably is copied from the provided window sequence information for channel 0 (Ch 0), although in other embodiments the information instead is copied from any other designated channel.

In the preferred embodiments, the general data structure for each LFE channel is as follows:

| | | |
|---|---|---|
| Huffman Code Book Indexes and Application Ranges | The number of code books | Indicates the number of code books. |
| | Application ranges | Application range of each Huffman code book. |
| | Code book indexes | Code book index of each Huffman code book. |
| Subband Sample Quantization Indexes | Quantization indexes of all subband samples. | |
| Quantization Step Size Indexes | Quantization step size index of each quantization unit. | |

As indicated above, the window sequence information (provided for normal channels only) preferably includes a MDCT window function index. In the present embodiment, that index is designated as "nWinTypeCurrent" and has the follows valueas and meanings:

| nWinTypeCurrent | Window Function | Window Function Length (the number of samples) |
|---|---|---|
| 0 | WIN_LONG_LONG2LONG | 2048 |
| 1 | WIN_LONG_LONG2SHORT | 2048 |
| 2 | WIN_LONG_SHORT2LONG | 2048 |
| 3 | WIN_LONG_SHORT2SHORT | 2048 |
| 4 | WIN_LONG_LONG2BRIEF | 2048 |
| 5 | WIN_LONG_BRIEF2LONG | 2048 |
| 6 | WIN_LONG_BRIEF2BRIEF | 2048 |
| 7 | WIN_LONG_SHORT2BRIEF | 2048 |
| 8 | WIN_LONG_BRIEF2SHORT | 2048 |
| 9 | WIN_SHORT_SHORT2SHORT | 256 |
| 10 | WIN_SHORT_SHORT2BRIEF | 256 |
| 11 | WIN_SHORT_BRIEF2BRIEF | 256 |
| 12 | WIN_SHORT_BRIEF2SHORT | 256 |

When nWinTypeCurrent=0, 1, 2, 3, 4, 5, 6, 7 or 8, a long MDCT window function is indicated, and that sing long window function is used for the entire frame. Other values of nWinTypeCurrent (nWinTypeCurrent=9, 10, 11 or 12) indicate a short MDCT window function. For those latter cases, the current frame is made up of nNumBlocksPerFrm (e.g., up to 8) short MDCTs, and nWinTypeCurrent indicates only the first and last window function of these nNumBlocksPerFrm short MDCTs. The other short window functions within the frame preferably are determined by the location where the transient appears, in conjunction with the perfect reconstruction requirements (as described in more detail in the '917 Application. In any event, the received data preferably includes window information that is adequate to fully identify the entire window sequence that was used at the encoder side.

In this regard, in the present embodiment the field "nNumCluster" indicates the number of transient segments in current frame. When the window function index nWinTypeCurrent indicates that a long window function is applied in the current frame (nWinTypeCurrent=0, 1, 2, 3, 4, 5, 6, 7 or 8), then the current frame is quasistationary, so the number of transient segments implicitly is 1, and nNumCluster does not need to appear in the bit stream (so it preferably is not transmitted).

On the other hand, in the preferred embodiments, 2 bits are allocated to nNumCluster when a short window function is indicated and its value ranges from 0-2, corresponding to 1-3 transient segments, respectively. It is noted that short window functions may be used even in a quasistationary frame (i.e., a single transient segment). This case can occur, e.g., when the encoder wanted to achieve low coding delay. In such a low-delay mode, the number of audio data samples in a frame can be less than 1,024 (i.e., the length of a long primary block). For example, the encoder might have chosen to include just 256 PCM samples in a frame, in which case it covers those samples with two short blocks (each including 128 PCM samples that are covered by a 256-sample MDCT block) in the frame, meaning that the decoder also applies two short windows. The advantage of this mode is that the coding delay, which is proportional to buffer size (if other conditions are the same), is reduced, e.g., by 4 times (1,024/256=4) in the present example.

If the current frame is a transient frame (i.e., includes at least a portion of a transient signal so that nNumCluster indicates more than one transient segment), then a field "anNumBlocksPerFrmPerCluster[nCluster]" preferably is included in the received data and indicates the length of each transient segment nCluster in terms of the number of short MDCT blocks it occupies. Each such word preferably is Huffman encoded (e.g., using HuffDec1_7×1 in Table B.28 of the '760 Application) and, therefore, each transient segment length can be decoded to reconstruct the locations of the transient segments.

On the other hand, if the current frame is a quasistationary frame (whether having a single long window function or a fixed number of short window functions) anNumBlocksPer- FrmPerCluster[nCluster] preferably does not appear in the bit stream (i.e., it is not transmitted) because the transient segment length is implicit, i.e., a single long block in a frame having a long window function (e.g., 2,048 MDCT samples) or all of the blocks in a frame having multiple (e.g., up to 8) short window functions (e.g., each containing 256 MDCT samples).

encoded, with HuffDec4_18×1 in the '760 Application being used to decode the value for quasistationary frames and HuffDec5_18×1 in the '760 Application being used to decode the value for transient frames.

The code books for decoding the actual Subband Sample Quantization Indexes are then retrieved based on the decoded mnHS[nCluster][nBand] code book indexes as follows:

| Code Book Index (mnHS) | Dimension | Quantization Index Range | Midtread | Quasistationary Code Book Group | Transient Code Book Group |
|---|---|---|---|---|---|
| 0 | 0 | 0 | reserved | reserved | reserved |
| 1 | 4 | −1, 1 | Yes | HuffDec10_81x4 | HuffDec19_81x4 |
| 2 | 2 | −2, 2 | Yes | HuffDec11_25x2 | HuffDec20_25x2 |
| 3 | 2 | −4, 4 | Yes | HuffDec12_81x2 | HuffDec21_81x2 |
| 4 | 2 | −8, 8 | Yes | HuffDec13_289x2 | HuffDec22_289x2 |
| 5 | 1 | −15, 15 | Yes | HuffDec14_31x1 | HuffDec23_31x1 |
| 6 | 1 | −31, 31 | Yes | HuffDec15_63x1 | HuffDec24_63x1 |
| 7 | 1 | −63, 63 | Yes | HuffDec16_127x1 | HuffDec25_127x1 |
| 8 | 1 | −127, 127 | Yes | HuffDec17_255x1 | HuffDec26_255x1 |
| 9 | 1 | −255, 255 | No | HuffDec18_256x1 | HuffDec27_256x1 |

As noted above, when the frame is covered by a single long block, that single block is designated by nWinTypeCurrent. However, the situation generally is a bit more complicated when the frame is covered by multiple short blocks. The reason for the additional complexity is that, due to the perfect reconstruction requirements, the window function for the current block depends upon the window functions that were used in the immediately adjacent previous and subsequent blocks. Accordingly, in the current embodiment of the invention, additional processing is performed in order to identify the appropriate window sequence when short blocks are indicated. This additional processing is described in more detail below in connection with the discussion of module 134.

The Huffman Code Book Index and Application Range information also is extracted by multiplexer 115. This information and the processing of it are described below.

Once the frame data have been unpacked as described above, the transform coefficients are retrieved and arranged in the proper order, and then inverse-transformation processing is performed to generate the original time-domain data. These general steps are described in greater detail below, with reference to FIG. 4.

Coefficient Retrieval.

Referring to FIG. 4, in module 118 the appropriate code books and application ranges are selected based on the corresponding information that was extracted in demultiplexer 15. More specifically, the above-referenced Huffman Code Book Index and Application Range information preferably includes the following fields.

The field "anHSNumBands[nCluster]" indicates the number of code book segments in the transient segment nCluster. The field "mnHSBandEdge[nCluster][nBand] *4" indicates the length (in terms of quantization indexes) of the code book segment nBand (i.e., the application range of the Huffman code book) in the transient segment nCluster; each such value itself preferably is Huffman encoded, with HuffDec2_64×1 (as set forth in the '760 Application) being used by module 18 to decode the value for quasistationary frames and HuffDec3_32×1 (also forth in the '760 Application) being used to decode the value for transient frames. The field "mnHS [nCluster][nBand]" indicates the Huffman code book index of the code book segment nBand in the transient segment nCluster; each such value itself preferably is Huffman where the dimension indicates the number of quantization indexes encoded by a single Huffman code and the referenced Huffman decoding tables preferably are as specified in the '760 Application.

It is noted that in the present embodiment, the length of each code book application range (i.e., each code book segment) is specified. Each such codebook segment may cross boundaries of one or more quantization units. Also, it is possible that the codebook segments may have been specified in other ways, e.g., by specifying the starting point for each code book application range. However, it generally will be possible to encode using a fewer total number of bits if the lengths (rather than the starting points) are specified.

In any event, the received information preferably uniquely identifies the application range(s) to which each code book is to be applied, and the decoder 100 uses this information for decoding the actual quantization indexes. This approach is significantly different than conventional approaches, in which each quantization unit is assigned a code book, so that the application ranges are not transmitted in conventional approaches. However, as discussed in more detail in the '760 Application, the additional overhead ordinarily is more than compensated by the additional efficiencies that can be obtained by flexibly specifying application ranges.

In module 120, the quantization indexes extracted by demultiplexer 15 are decoded by applying the code books identified in module 18 to their corresponding application ranges of quantization indexes. The result is a fully decoded set of quantization indexes.

In module 122, the number of quantization units is reconstructed. In this regard, each "quantization unit" preferably is defined by a rectangle of quantization indexes bounded by a critical band in the frequency domain and by a transient segment in the time domain. All quantization indexes within this rectangle belong to the same quantization unit. The transient segments preferably are identified, based on the transient segment information extracted by multiplexer 115, in the manner described above. A "critical band" refers to the frequency resolution of the human ear, i.e., the bandwidth Δf within which the human ear is not capable of distinguishing different frequencies. The bandwidth Δf preferably rises along with the frequency f, with the relationship between f and Δf being approximately exponential. Each critical band can be represented as a number of adjacent subband samples of the filter bank. The preferred critical bands for the short and long windows and for the different sampling rates are set for in tables B.2 through B.27 of the '760 Application. In other words, the boundaries of the critical bands are determined in advance for each MDCT block size and sampling rate, with the encoder and decoder using the same critical bands. From the foregoing information, the number of quantization units is reconstructed as follows.

```
for (nCluster=0; nCluster<nNumCluster; nCluster++)
{
     nMaxBand = anHSNumBands[nCluster];
     nMaxBin = mnHSBandEdge[nCluster][nMaxBand−1]*4;
     nMaxBin = Ceil(nMaxBin/anNumBlocksPerCluster[nCluster]);
     nCb = 0;
     while ( pnCBEdge[nCb] < nMaxBin )
          {
               nCb++;
          }
     anMaxActCb[nCluster] = nCb;
}
```

where anHSNumBands[nCluster] is the number of codebooks for transient segment nCluster, mnHSBandEdge [nCluster][nBand] is the upper boundary of codebook application range for codebook nBand of transient segment nCluster, pnCBEdge[nBand] is the upper boundary of critical band nBand, and anMaxActCb[nCluster] is the number of quantization units for transient segment nCluster.

In dequantizer module 124, the quantization step size applicable to each quantization unit is decoded from the bit stream 20, and such step sizes are used to reconstruct the subband samples from quantization indexes received from decoding module 120. In the preferred embodiments, "mnQStepIndex[nCluster][nBand]" indicates the quantization step size index of quantization unit (nCluster, nBand) and is decoded by Huffman code book HuffDec6__116×1 for quasistationary frames and by Huffman code book HuffDec7__116×1 for transient frames, both as set forth in the '760 Application.

Once the quantization step sizes are identified, each subband sample value preferably is obtained as follows (assuming linear quantization was used at the encoder): Subband sample=Quantization step size*Quantization index. In alternate embodiments of the invention, nonlinear quantization techniques are used.

Joint intensity decoding in module 128 preferably is performed only if indicated by the value of bUseJIC. If so, the joint intensity decoder 128 copies the subband samples from the source channel and then multiplies them by the scale factor to reconstruct the subband samples of the joint channel, i.e., Joint channel samples=Scale factor*Source channel samples in one representative embodiment, the source channel is the front left channel and each other normal channel has been encoded as a joint channel. Preferably, all of the subband samples in the same quantization unit have the same scale factor.

Sum/difference decoding in module 130 preferably is performed only if indicated by the value of bUseSumDiff. If so, reconstruction of the subband samples in the left/right channel preferably is performed as follows:

Left channel=sum channel+difference channel; and

Right channel=sum channel−difference channel.

As described in the '346 Application, in the preferred embodiments the encoder, in a process called interleaving, rearranges the subband samples for the current frame of the current channel so as to group together samples within the same transient segment that correspond to the same subband. Accordingly, in de-interleaving module 132, the subband samples are rearranged back into their natural order. One technique for performing such rearrangement is as follows:

```
p = 0;
for (nCluster=0; nCluster<nNumCluster; nCluster++)
{
     nBin0 = anClusterBin0[nCluster];
     nNumBlocksPerFrm = anNumBlocksPerFrmPerCluster[nCluster];
     for (nBlock=0; nBlock<nNumBlocksPerFrm; nBlock++)
          {
               q = nBin0;
               for (n=0; n<128; n++)
          {
                    afBinNatural[p] = afBinInterleaved[q];
                    q += nNumBlocksPerFrm;
                    p++;
               }
               nBin0++;
     }
}
```

where nNumCluster is the number of transient segments, anNumBlocksPerFrmPerCluster[nCluster] is the transient segment length for transient segment nCluster, nClusterBin0 [nCluster] is the first subband sample location of transient segment nCluster, afbinlnterleaved[q] is the array of subband samples arranged in interleaved order, and afBinNatural[p] is the array of subband samples arranged in natural order.

Accordingly, following the processing performed by de-interleaving module 132, the subband samples for each frame of each channel are output in their natural order.

Conversion to Time-Based Samples.

In module 134, the sequence of window functions that was used (at the encoder side) for the transform blocks of the present frame of data is identified. As noted above, in the present embodiment the MDCT transform was used at the encoder side. However, in other embodiments other types of transforms (preferably unitary and sinusoidal-based) may have been used and can be fully accommodated by the decoder 100 of the present invention. In the present embodiment, as noted above, for a long transform-block frame the received field nWinTypeCurrent identifies the single long window function that was used for the entire frame. Accordingly, no additional processing needs to be performed in module 134 for long transform-block frames in this embodiment.

On the other hand, for short transform-block frames the field nWinTypeCurrent in the current embodiment only specifies the window function used for the first and the last transform block. Accordingly, the following processing preferably is performed for short transform-block frames.

When short blocks are being used in the frame, the received value for nWinTypeCurrent preferably identifies whether the first block of the current frame and the first block of the next frame contain a transient signal. This information, together with the locations of the transient segments (identified from the received transient segment lengths) and the perfect reconstruction requirements, permits the decoder 100 to determine which window function to use in each block of the frame.

Because the WIN_SHORT_BRIEF2BRIEF window function is used for a block with a transient in the preferred embodiments, the following nomenclature may be used to convey this information. WIN_SHORT_Current2Subs, where Current (SHORT=no, BRIEF=yes) identifies if there is a transient in the first block of the current frame, and Subs (SHORT=no, BRIEF=yes) identifies if there is a transient in the first block of the subsequent frame. For example, WIN_SHORT_BRIEF2BRIEF indicates that there is a transient in the first block of the current frame and in the first block of the subsequent frame, and WIN_SHORT_BRIEF2SHORT indicates that there is a transient in the first block of the current frame but not in the first block of the subsequent frame.

Thus, Current assists in the determination of the window function in the first block of the frame (by indicating whether the first block of the frame includes a transient signal) and Subs helps identify the window function for the last block of the frame (by indicating whether the first block of the subsequent frame includes a transient signal). In particular, if Current is SHORT, the window function for the first block should be WIN_SHORT_Last2SHORT, where "Last" is determined by the last window function of the last frame via the perfect reconstruction property. On the other hand, if Current is BRIEF, the window function for the first block should be WIN_SHORT_Last2BRIEF, where Last is again determined by the last window function of the last frame via the perfect reconstruction property. For the last block of the frame, if it contains a transient, its window function should be WIN_SHORT_BRIEF2BRIEF. When there is no transient in this block, if Subs is SHORT, the window function for the last block of the frame should be WIN_SHORT_Last2SHORT, where Last is determined by the window function of the second last block of the frame via the perfect reconstruction property. On the other hand, if Subs is BRIEF, the window function for the last block of the frame should be WIN_SHORT_Last2 BRIEF, where Last is again determined by the window function of the second last block of the frame via the perfect reconstruction property. Finally, the window functions for the rest of the blocks in the frame can be determined by the transient location(s), which is indicated by the start of a transient segment, via the perfect reconstruction property. A detailed procedure for doing this is given in the '917 Application.

In module 136, for each transform block of the current frame, the subband samples are inverse transformed using the window function identified by module 134 for such block to recover the original data values (subject to any quantization noise that may have been introduced in the course of the encoding and other numerical inaccuracies).

The output of module 136 is the reconstructed sequence of PCM samples that was input to the encoder.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

The foregoing embodiments pertain to the processing of audio data. However, it should be understood that the techniques of the present invention also can be used in connection with the processing of other types of data, such as video data, sensor data (e.g., seismological, weather, radiation), economic data, or any other observable or measurable data.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of decoding an audio signal, comprising:

(a) obtaining a bit stream that includes a plurality of frames, each frame including processing information pertaining to said frame and entropy-encoded quantization indexes representing audio data within said frame, and the processing information including:

(i) a plurality of code book indexes, each code book index identifying a code book, (ii) code book application information specifying ranges of entropy-encoded quantization indexes to which the code books are to be applied, and (iii) window information;

(b) decoding the entropy-encoded quantization indexes by applying the code books identified by the code book indexes to the ranges of entropy-encoded quantization indexes specified by the code book application information;

(c) generating subband samples by dequantizing the decoded quantization indexes;

(d) identifying a sequence of plural different window functions that were applied within a single frame of the audio data based on the window information; and (e) obtaining time-domain audio data by inverse-transforming the subband samples and using, within the single frame of the audio data, the plural different window functions indicated by the window information, wherein at least one of the application ranges for at least one of the code books is different than any of the quantization units, a quantization unit being defined by a rectangle of quantization indexes that is bounded by a critical band in a frequency domain and by a transient segment in a time domain.

2. A method according to claim 1, wherein at least one of the ranges of entropy-encoded quantization indexes crosses a boundary of a quantization unit.

3. A method according to claim 1, wherein the code book application information identifies one range of entropy-encoded quantization indexes for each code book identified by the code book indexes.

4. A method according to claim 1, wherein the code book application information specifies a length of entropy-encoded quantization indexes for each code book identified by the code book indexes.

5. A method according to claim 1, wherein the window information indicates a location of a transient within the frame, and wherein the sequence of plural different window functions is identified in step (d) based on predetermined rules related to the location of the transient.

6. A method according to claim 5, wherein the predetermined rules specify that a particular window function was used in any transform block that includes a transient.

7. A method according to claim 6, wherein the predetermined rules also conform to perfect reconstruction requirements.

8. A method according to claim 5, wherein the particular window function is narrower than others of the plural different window functions within the single frame of the audio data.

9. A method according to claim 5, wherein the particular window function is symmetric and occupies only a central portion of its entire transform block, having a plurality of 0 values at each end of its transform block.

10. A method according to claim 1, wherein each of: (i) the plurality of code book indexes, (ii) the code book application information and (iii) the window information is entropy-encoded.

11. A non-transitory computer-readable medium storing computer-executable process steps for decoding an audio signal, said process steps comprising steps of:

(a) obtaining a bit stream that includes a plurality of frames, each frame including processing information pertaining to said frame and entropy-encoded quantization indexes representing audio data within said frame, and the processing information including:

(i) a plurality of code book indexes, each code book index identifying a code book, (ii) code book application information specifying ranges of entropy-encoded quantization indexes to which the code books are to be applied, and (iii) window information;

(b) decoding the entropy-encoded quantization indexes by applying the code books identified by the code book indexes to the ranges of entropy-encoded quantization indexes specified by the code book application information;

(c) generating subband samples by dequantizing the decoded quantization indexes;

(d) identifying a sequence of plural different window functions that were applied within a single frame of the audio data based on the window information; and (e) obtaining time-domain audio data by inverse-transforming the subband samples and using, within the single frame of the audio data, the plural different window functions indicated by the window information, wherein at least one of the application ranges for at least one of the code books is different than any of the quantization units, a quantization unit being defined by a rectangle of quantization indexes that is bounded by a critical band in a frequency domain and by a transient segment in a time domain.

12. A non-transitory computer-readable medium according to claim 11, wherein at least one of the ranges of entropy-encoded quantization indexes crosses a boundary of a quantization unit.

13. A non-transitory computer-readable medium according to claim 11, wherein the window information indicates a location of a transient within the frame, and wherein the sequence of plural different window functions is identified by step (d) based on predetermined rules related to the location of the transient, wherein the predetermined rules specify that a particular window function was used in any transform block that includes a transient, and wherein the predetermined rules also conform to perfect reconstruction requirements.

14. A non-transitory computer-readable medium according to claim 11, wherein the particular window function is symmetric and occupies only a central portion of its entire transform block, having a plurality of 0 values at each end of its transform block.

15. A non-transitory computer-readable medium according to claim 11, wherein each of: (i) the plurality of code book indexes, (ii) the code book application information and (iii) the window information is entropy-encoded.

16. An apparatus for decoding an audio signal, comprising:

(a) means for obtaining a bit stream that includes a plurality of frames, each frame including processing information pertaining to said frame and entropy-encoded quantization indexes representing audio data within said frame, and the processing information including:

a plurality of code book indexes, each code book index identifying a code book, (ii) code book application information specifying ranges of entropy-encoded quantization indexes to which the code books are to be applied, and (iii) window information;

(b) means for decoding the entropy-encoded quantization indexes by applying the code books identified by the code book indexes to the ranges of entropy-encoded quantization indexes specified by the code book application information;

(c) means for generating subband samples by dequantizing the decoded quantization indexes;

(d) means for identifying a sequence of plural different window functions that were applied within a single frame of the audio data based on the window information; and (e) means for obtaining time-domain audio data by inverse-transforming the subband samples and using, within the single frame of the audio data, the plural different window functions indicated by the window information, wherein at least one of the application ranges for at least one of the code books is different than any of the quantization units, a quantization unit being defined by a rectangle of quantization indexes that is bounded by a critical band in a frequency domain and by a transient segment in a time domain.

17. An apparatus according to claim 16, wherein at least one of the ranges of entropy-encoded quantization indexes crosses a boundary of a quantization unit.

18. An apparatus according to claim 16, wherein the window information indicates a location of a transient within the frame, and wherein the sequence of plural different window functions is identified by said means (d) based on predetermined rules related to the location of the transient, wherein the predetermined rules specify that a particular window function was used in any transform block that includes a transient, and wherein the predetermined rules also conform to perfect reconstruction requirements.

19. An apparatus according to claim 16, wherein the particular window function is symmetric and occupies only a central portion of its entire transform block, having a plurality of 0 values at each end of its transform block.

20. An apparatus according to claim 16, wherein each of: (i) the plurality of code book indexes, (ii) the code book application information and (iii) the window information is entropy-encoded.

* * * * *

UNITED STATES PATENT AND TRADEMARK OFFICE

CERTIFICATE OF CORRECTION

PATENT NO. : 7,937,271 B2
APPLICATION NO. : 11/689371
DATED : May 3, 2011
INVENTOR(S) : Yuli You It is certified that error appears in the above-identified patent and that said Letters Patent is hereby corrected as shown below:

In column 5 line 45, change “nNum Word” to --nNumWord--.

In column 5 lines 59-60, change “According” to --Accordingly--.

In column 5 line 61, change “sample, then” to --samples, then--.

In column 6 line 26, change “nfrmHeader Type” to --nFrmHeaderType--.

In column 6 line 31, change “nNumLfe” to --nNumLfeCh--.

In column 6 line 32, change “nFrMHeaderType” to --nFrmHeaderType--.

In column 6 line 54, change “njicCb” to --nJicCb--.

In column 7 line 53, change “follows valueas” to --following values--.

In column 8 line 14, change “sing long” to --single long--.

In column 12 line 29, change “afbinInterleaved[q]” to --afBinInterleaved[q]--.

Signed and Sealed this
Twenty-seventh Day of November, 2012

David J. Kappos
*Director of the United States Patent and Trademark Office*